(12) United States Patent
Oh et al.

(10) Patent No.: US 7,801,870 B2
(45) Date of Patent: Sep. 21, 2010

(54) METHOD OF SYNCHRONIZING INFORMATION SHARED BETWEEN A PLURALITY OF UNIVERSAL PLUG AND PLAY DEVICES AND APPARATUS THEREFOR

(75) Inventors: Seung-jae Oh, Seoul (KR); Se-hee Han, Seoul (KR); Won-Seok Kwon, Suwon-si (KR); Joo-yeol Lee, Seoul (KR); Dong-shin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 11/925,009

(22) Filed: Oct. 26, 2007

(65) Prior Publication Data

US 2008/0104142 A1 May 1, 2008

Related U.S. Application Data

(60) Provisional application No. 60/854,440, filed on Oct. 26, 2006.

(30) Foreign Application Priority Data

Jun. 28, 2007 (KR) .................. 10-2007-0064617

(51) Int. Cl.
*G06F 17/00* (2006.01)
(52) U.S. Cl. ...................... 707/695; 713/178

(58) Field of Classification Search .................. 707/609, 707/695, 705, 802, 821; 713/178, 400
See application file for complete search history.

(56) References Cited

U.S. PATENT DOCUMENTS

| 6,778,503 B1 * | 8/2004 | Sproat et al. ................. 370/247 |
| 2005/0135341 A1 | 6/2005 | Kim |
| 2005/0240680 A1 * | 10/2005 | Costa-Requena et al. ... 709/250 |

FOREIGN PATENT DOCUMENTS

| KR | 1020020032665 A | 5/2002 |
| KR | 1020040013465 A | 2/2004 |
| KR | 100599204 B1 | 7/2006 |

\* cited by examiner

*Primary Examiner*—Fred I Ehichioya
(74) *Attorney, Agent, or Firm*—Sughrue Mion, PLLC (57) ABSTRACT

A method of effectively managing information shared by synchronizing between a plurality of Universal Plug and Play (UPnP) devices is provided. According to the method, all devices exchange version information of the devices at initial synchronization, and when shared information stored in some of the devices is changed, a device changing shared information transmits new version information to the other devices via an event message, so that all of the devices can maintain the latest shared information. Also, by having a counter indicating an update state of respective parts of shared information, when shared information is changed by a plurality of the UPnP devices, it is easy to recognize which part from among the respective parts of the shared information is the latest.

19 Claims, 7 Drawing Sheets

```xml
<?xml version="1.0" en coding="utf -8">
<ContentSync>
 <syncRelationship id="S1" active="1" systemUpdateID=201 >
   <title>Sync between My iPod, My PMP and Home Media Server</title>
   <syncPolicy type="merge"/>
   <partnership id="P1" active="1" updateID=0 >
     <partner> device 1</partner>
     <partner> device 2 </partner>
     <partnershipPolicy>
       <precedence>participant1</precedence>
     </partnershipPolicy>
     <pairing id="pairing1" active="1">
         <pairingPolicy syncType="replace">
            <source> device 1 </source>
            <sink> device 2 </sink>
         </pairingPolicy>
     </pairing>
     <pairing id="pairing2" active="1">
         <pairingPolicy syncType="replace">
            <source> device 2 </source>
            <sink> device 1 </sink>
         </pairingPolicy>
      </pairing>
      <!-- More pairings can go here -->
   </partnership>
   <partnership id="P2" active="1" updateID=0>
     <partner> device 1 </partner>
     <partner> device 3 </partner>
     <partnershipPolicy>
        <precedence> device 1 </precedence>
       </partnershipPolicy>
   </partnership>
   <!-- More partnerships can go here -->
 </syncRelationship>
```

FIG. 6B

```xml
<?xml version="1.0" encoding="UTF-8"?>
<SyncRelationshipUpdate>
    xmlns="urn:schemas-upnp-org:avwc:cds-sync-relationshipID"
    xmlns:upnp="urn:schemas-upnp-org:metadata-1-0/upnp/"
    xmlns:xsi="http://www.w3.org/2001/XMLSchema-instance"
    xsi:schemaLocation="
    urn:schemas-upnp-org:avwc:cds-syncevent
    http://upnp.org/standardizeddcps/schemas/avwc/xyz">
    <DeviceUDN>
        uuid:70a74981-35f3-4262-84e8-ba0ec1794c0c
    </DeviceUDN>
    <SyncRelationshipIDList>
        <SyncRelationshipID status="Modified" systemUpdateID="201">S1</SyncRelationshipID>
    </SyncRelationshipIDList>
</SyncRelationshipUpdate>
```

METHOD OF SYNCHRONIZING INFORMATION SHARED BETWEEN A PLURALITY OF UNIVERSAL PLUG AND PLAY DEVICES AND APPARATUS THEREFOR

CROSS-REFERENCE TO RELATED PATENT APPLICATION

This application claims the benefit of Korean Patent Application No. 10-2007-0064617, filed on Jun. 28, 2007, in the Korean Intellectual Property Office, and the benefit of U.S. Provisional Patent Application No. 60/854,440, filed on Oct. 26, 2006, in the U.S. Patent and Trademark Office, the disclosures of which are incorporated herein in their entirety by reference.

BACKGROUND OF THE INVENTION

1. Field of the Invention

Methods and apparatuses consistent with the present invention relate to a Universal Plug and Play (UPnP) device, and more particularly, to a method of sharing information between a plurality of UPnP devices.

2. Description of the Related Art

UPnP is a technology enabling communication between devices connected to a network, without a complicated setting process, and enabling one device to automatically search for a service provided by another device. In a UPnP network, users only have to connect a device to a network, whereby equipment already connected to the network automatically finds the newly added device so that the users can easily use a service provided by another device connected to the network.

In a UPnP environment as described above, information to be stored in a device tends to be dependent on the device, i.e., in many cases, the information is available only in the device. For example, in a content directory service that is one of a plurality of services provided by a UPnP media server, there is a database for media information stored in a local storage, and the database is available only to a corresponding media server. However, in the case where several devices cooperate so as to perform a certain operation, the devices may mutually share information that is common to the devices. In the case where the shared information may be individually changed by each of the devices, currently, there is no method of synchronizing the information shared between UPnP devices.

Also, in a related art UPnP environment, when certain information in a device is changed, an event message is provided so as to inform another control point of the change. That is, when certain information in a device is changed, the device informs other devices subscribing to event messages of the device via an event message that the information is changed. Then, a subscribing device receiving the event message obtains the changed information via a UPnP action. That is, in the related art UPnP environment, a device subscribing to event messages is only informed that information is changed, and the subscribing device receiving an event message analyzes the entire changed information, so as to check for a part different from information of the subscribing device. According to this related art technology, in the case where information shared between a plurality of UPnP devices is individually changed by each of the UPnP devices, it is not possible to know which part from among changed parts of the shared information is the latest, and thus synchronization of shared information between devices having the shared information is difficult.

SUMMARY OF THE INVENTION

The present invention provides a method and apparatus for sharing information between a plurality of UPnP devices, and managing the shared information by synchronizing the shared information.

According to an aspect of the present invention, there is provided a method of managing shared information synchronized between one device and at least one other device in a UPnP (Universal Plug and Play) network, the method including: storing version information of the synchronized shared information of the at least one other device; comparing version information comprised in an event message received from the at least one other device with the stored version information; and selectively updating the synchronized shared information of the one device, based on the comparison result, wherein a part of the synchronized information that is to be possibly changed by the respective devices is determined in advance.

The operation of updating the synchronized shared information may include receiving changed shared information from the at least one other device that has changed the shared information, and version information of the changed shared information; changing the synchronized shared information of the one device so as to be the same as the received shared information; and changing version information from among the stored version information corresponding to the received shared information, to the received version information.

The synchronized shared information may include counter values for each of parts increasing whenever each of the parts is changed, and wherein when there are a plurality of other devices that have changed the synchronized shared information, the changing of the synchronized shared information comprises changing each part of the synchronized shared information of the one device by referring to the counter values.

The version information to be stored may be received from the other device via an event message.

The method of managing shared information may further include subscribing to event messages for version information of the synchronized shared information stored in the other device.

The version information of the synchronized shared information of the at least one other device may be a System Update identification (ID) of when the synchronization is performed, the System Update ID is managed by a content directory service (CDS) of the other device, and the version information included in the event message may be a System Update ID of when the at least one other device that has changed the synchronized shared information.

According to another aspect of the present invention, there is provided a recording medium having recorded thereon a program for executing the method of managing shared information.

According to another aspect of the present invention, there is provided an apparatus for managing shared information synchronized between one device and at least one other device in a UPnP network, the apparatus including: a storage unit storing version information of the synchronized shared information of the at least one other device; a comparison unit comparing version information comprised in an event message received from the at least one other device with the stored version information; and a synchronization unit selectively updating the synchronized shared information of the one device, based on the comparison result, wherein a part of the synchronized information that is to be possibly changed by the respective devices is determined in advance.

According to another aspect of the present invention, there is provided a method of managing shared information synchronized between one device and at least one other device in a UPnP network, the method including: transmitting version information of the synchronized shared information of the one device to the at least one other device via an event message; changing the version information, when the synchronized shared information of the one device is changed by an input from users; and transmitting the changed version information to the at least one other device via an event message, wherein a part of the synchronized information that is to be possibly changed by the respective devices is determined in advance.

The synchronized shared information may comprise counter values for each of parts increasing whenever each of the parts is changed.

According to another aspect of the present invention, there is provided a recording medium having recorded thereon a program for executing the method of managing shared information.

According to another aspect of the present invention, there is provided an apparatus for managing shared information synchronized between one device and at least one other device in a UPnP network, the apparatus including: a change unit changing version information, when the synchronized shared information of the one device is changed by an input from users; and an eventing unit transmitting version information of the synchronized shared information of the one device to the at least one other device via an event message, and when version information is changed by the change unit, transmitting the changed version information to the at least one other device via an event message, wherein a part of the synchronized information that is to be possibly changed by the respective devices is determined in advance.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

The present invention will now be described more fully with reference to the accompanying drawings. For convenience of description, a UPnP device is simply indicated as a device.

Also, in the present invention, it is assumed that a part of shared information that is to be possibly changed by each of a plurality of UPnP devices is determined in advance, and the shared information is synchronized by the plurality of UPnP devices. This scenario may frequently occur in a home network. For example, when shared information is hardware information on devices, a part to be possibly changed by each of the devices is only hardware information on the device itself, and the device cannot change hardware information on other devices.

Figure 1:
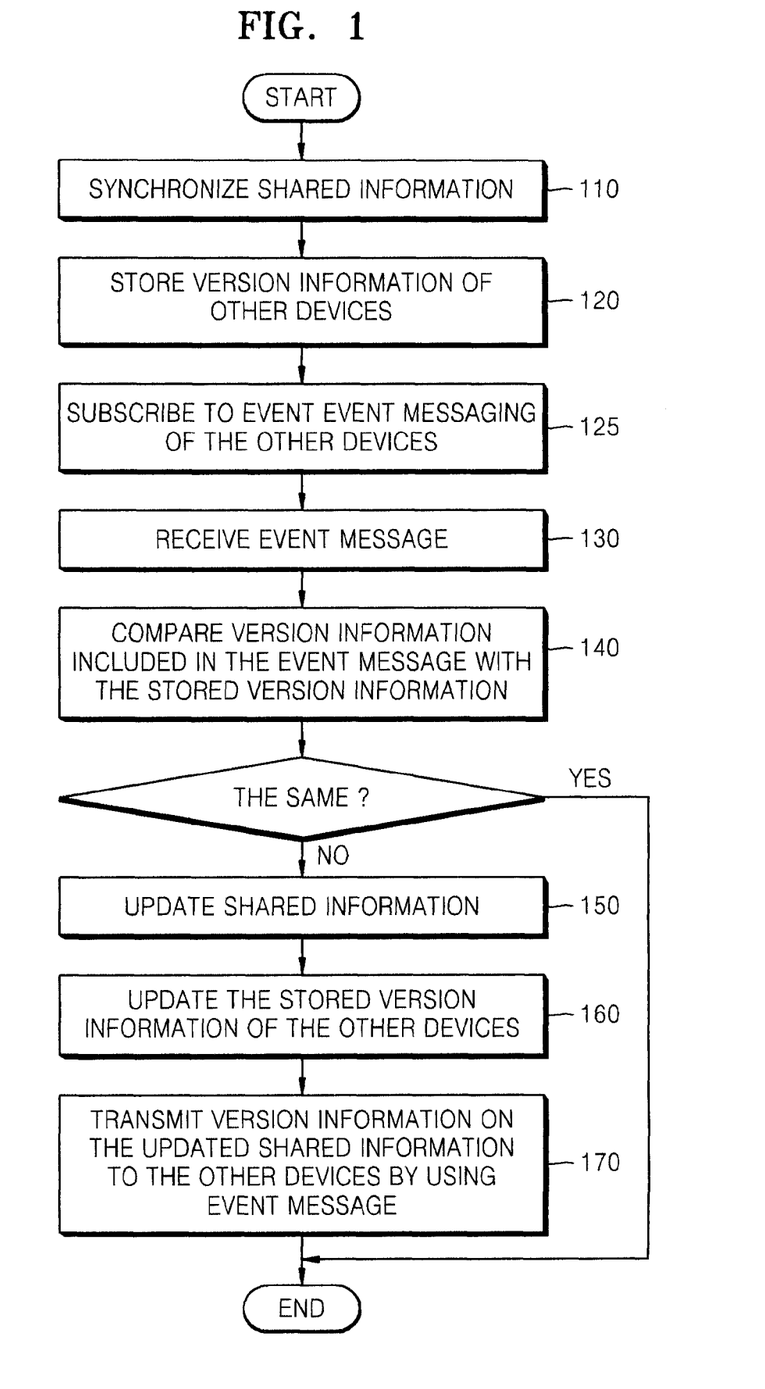
FIG. 1 is a flowchart illustrating a process of synchronizing shared information performed by a UPnP device according to an exemplary embodiment of the present invention.
Figure 2:
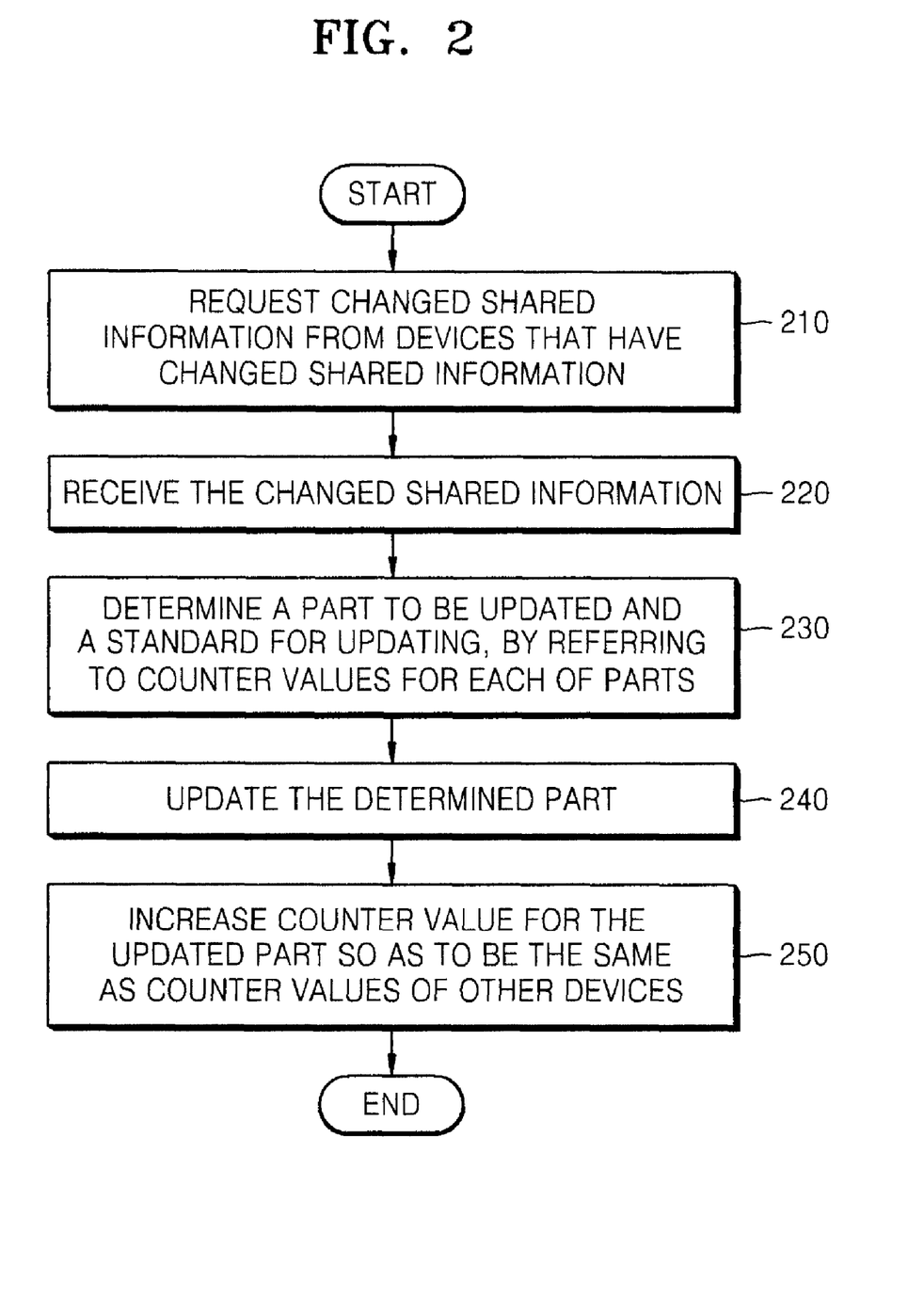
FIG. 2 is a flowchart illustrating a process of updating shared information performed by a UPnP device according to another exemplary embodiment of the present invention.

FIG. 1 is a flowchart illustrating a process of synchronizing shared information performed by a UPnP device according to an exemplary embodiment of the present invention. Hereinafter, a device performing operations in relation to FIGS. 1 and 2 is indicated as an A device, and devices sharing the same information as the A device are indicated as other devices.

In operation 110, the A device synchronizes shared information shared with the other devices. A process of initially generating shared information also corresponds to operation 110.

In operation 120, the A device stores version information of the other devices. The version information is information indicating an update state of shared information, and the version information of the other devices is individually managed by each of the other devices. The A device manages the version information of shared information of the A device.

At this time, a System Update ID may be used as the version information. The System Update ID is information managed by a CDS, and is a value that is increased whenever information related to the CDS is changed. That is, the other devices set a System Update ID when shared information is synchronized, as version information of the synchronized shared information.

In operation 125, the A device subscribes to event messaging for version information of shared information of the other devices. Therefore, the A device may receive the version information of the other devices via an event message. That is, whenever version information is changed, the other devices transmit the changed version information to the A device via an event message.

Meanwhile, when version information of the A device is changed, the A device also has to transmit the changed version information to the other devices via an event message. In other words, in the present invention, all devices synchronizing shared information have to exchange version information of shared information of each other via an event message. Thus, all the devices synchronizing the shared information have to subscribe to event messages for version information of shared information of each other.

In operation 130, the A device receives an event message from at least one of the other devices. At this time, the received event message is used by the other devices which have changed shared information, so as to inform version information about the changed shared information.

In operation 140, the A device compares the version information included in the event message with the version information stored in operation 120, that is, the version information of shared information stored in the other devices when shared information is recently synchronized with the other devices.

In operation 150, as a result of the comparison, when version information is not identical, shared information stored in the A device is updated. When the version information stored in operation 120, and the version information included in the event message received in operation 130 are different, it means that shared information stored in at least one of the other devices is changed. Therefore, the A device performs synchronization by changing shared information of the A device so as to be identical with the latest shared information of the other devices. A more detailed description about operation 150 will be described later, with reference to FIG. 2.

In operation 160, the A device updates stored version information of the other devices. That is, when version information of a B device stored in operation 120 is 105, while version information included in an event message received from the B device in operation 130 is 200, then the A device updates stored version information of the B device to 200.

In operation 170, the A device transmits version information of updated shared information of the A device to the other devices via an event message. At this time, the version information of updated shared information may be a System Update ID of the A device when shared information of the A device is updated in operation 150.

FIG. 2 is a flowchart illustrating a process of updating shared information performed by a UPnP device according to another exemplary embodiment of the present invention. Here, for convenience of description, it is assumed that there is a plurality of other devices changing shared information.

In such a case, regarding the same parts of shared information, it is not possible to know which device has the latest part. Thus, in an exemplary embodiment of the present invention, a counter value is provided by which shared information indicates version information of each part. A counter value for each part is increased whenever the each part is changed. When the A device receives partly changed shared information from other devices, the A device may know which one among the received shared information is the latest for each part, by referring to the counter value. Since a counter value is included in shared information, when the A device synchronizes shared information with the other devices, counter values included in the shared information of all devices become identical.

In operation 210, the A device requests changed shared information from other devices changing shared information. For this request, a UPnP action provided by services of the other devices may be used.

In operation 220, the A device receives the changed shared information from the other devices.

In operation 230, the A device refers to counter values included in the changed shared information, so as to determine which part from among shared information of the A device, has to be updated. The A device may refer to counter values for each part of shared information respectively received from the B device and a C device, and determine how to update the shared information and which part from among shared information of the A device has to be updated. For example, when a counter value for a part X of shared information of the A device is smaller than a counter value for part X of the B device, then, the A device has to update the part X of shared information of the A device so as to be the same as changed shared information of the B device. However, when a counter value for part X of the C device is larger than a counter value for part X of the B device, the A device has to update the part X of shared information of the A device so as to be the same as changed shared information of the C device.

In operation 240, the A device updates shared information of the A device.

In operation 250, when the shared information of the A device is updated, a counter value for an updated part is also updated. For example, if the part X of shared information of the A device is updated so as to be identical with shared information of the B device, then a counter value for the part X of shared information of the A device is increased so as to be identical to a counter value for the part X of the B device.

Figure 3:
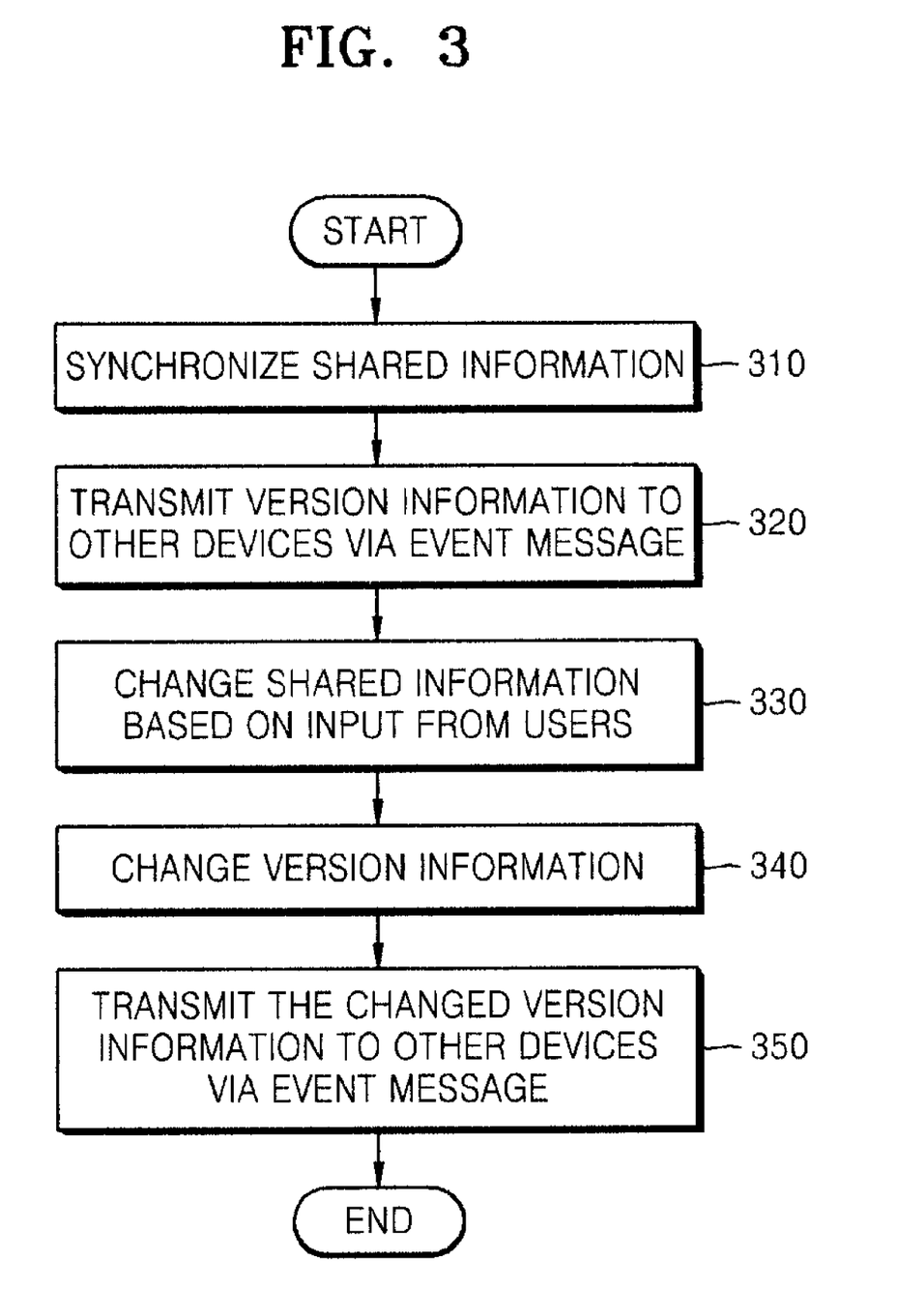
FIG. 3 is a flowchart illustrating an operating process of a UPnP device, in the case where shared information is changed by users, according to another exemplary embodiment of the present invention.

FIG. 3 is a flowchart illustrating an operating process of a UPnP device, in the case where shared information is changed by users, according to another exemplary embodiment of the present invention. Hereinafter, a UPnP device performing operations illustrated in FIG. 3 is indicated as an A device.

In operation 310, the A device synchronizes shared information with other devices.

In operation 320, the A device transmits version information of the synchronized shared information to other devices via an event message. As described above, a System Update ID of the A device when shared information is synchronized may be used as the version information.

In operation 330, shared information stored in the A device is changed by an input from users. Generally, an embedded control point (CP) of the A device may be used in this operation.

In operation 340, the A device changes version information of shared information of the A device. A System Update ID of the A device when shared information is changed may be used as the version information of shared information.

In operation 350, the A device transmits the changed version information to the other devices via an event message.

Figure 4:
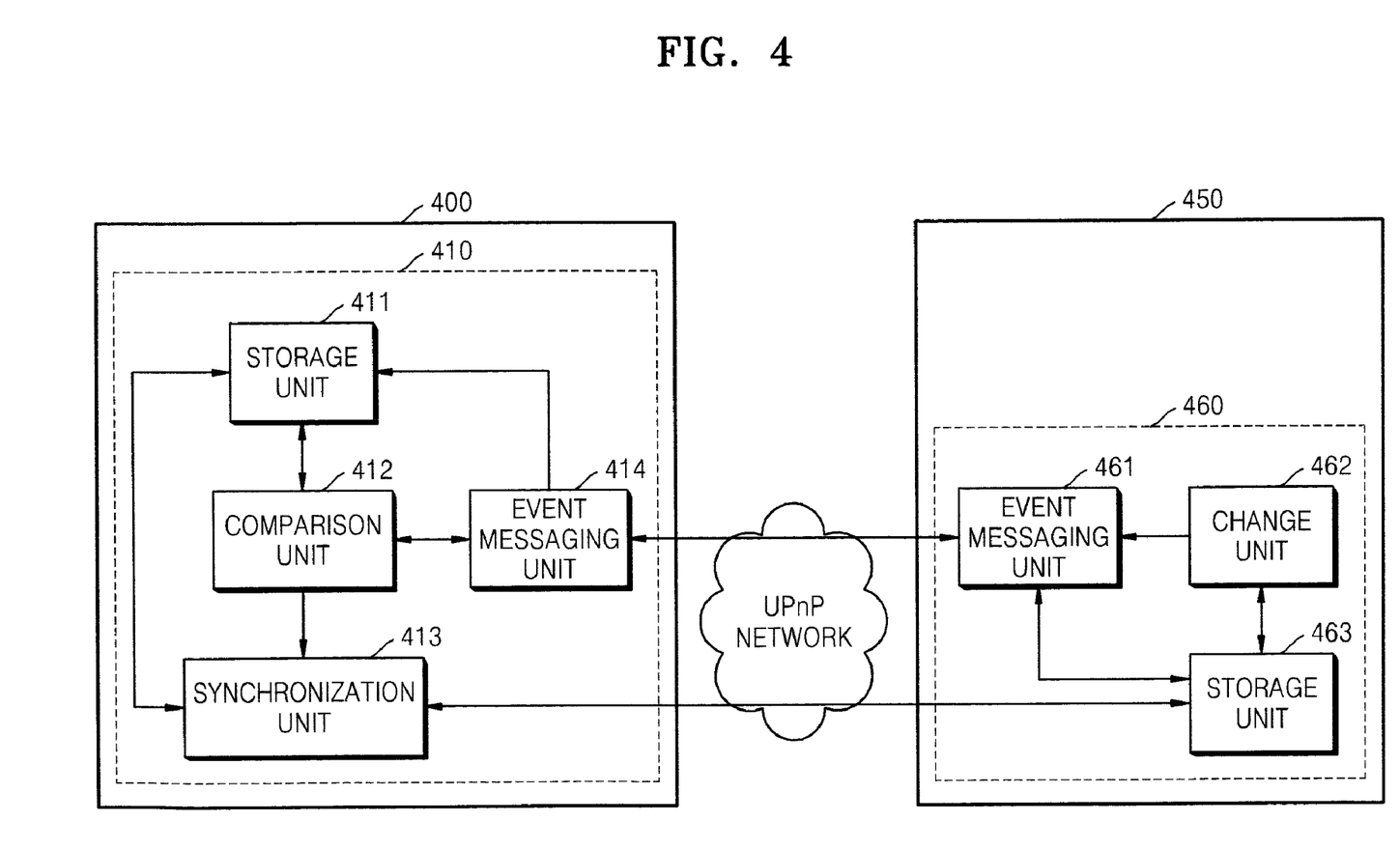
FIG. 4 is a block diagram illustrating a structure of UPnP devices according to another exemplary embodiment of the present invention.

FIG. 4 is a block diagram illustrating a structure of UPnP devices according to another exemplary embodiment of the present invention.

A device 400 illustrated on the left side of the diagram is indicated as an A device, and a device 450 illustrated on the right side of the diagram is indicated as a B device. The A device and the B device communicate via a UPnP network. The case to be described here is when shared information of the B device is changed by users so that the A device synchronizes shared information of the A device with the shared information of the B device. For convenience of description, components of the A device and the B device are differently illustrated. However, it will be obvious to those of ordinary skill in the art that a UPnP device synchronizing shared information according to an exemplary embodiment of the present invention may include all components of the A device and the B device.

The A device 400 includes a synchronization apparatus 410, and the synchronization apparatus 410 includes a storage unit 411, a comparison unit 412, a synchronization unit 413, and an event messaging unit 414.

The storage unit 411 stores version information of shared information of the B device 450, and shared information of the A device 400. The version information of shared information of the B device 450 is received from the B device 450 via an event message. The event messaging unit 414 requests an event messages subscription to version information of shared information from the B device 450, receives an event message from the B device 450, and transmits an event message to the B device 450.

When the event messaging unit 414 receives an event message including changed version information from the B device 450, since shared information of the B device 450 is changed, the comparison unit 412 compares version information of shared information of the B device 450 stored in the storage unit 411 with the version information included in the event message, so as to determine whether to update shared information of the A device 400.

As a result of determination in the comparison unit 412, when the shared information of the A device 400 has to be updated, the synchronization unit 413 updates the shared information stored in the storage unit 411, based on the shared information of the B device 450.

As described above, for the case where more than two devices change shared information, the present invention sets a counter indicating an update state of each part of shared information. Thus, in the case where more than two devices change shared information, the synchronization unit 413 may easily find the latest part from among changed parts of shared information, and based on the latest part, the synchronization unit 413 may update the shared information of the A device 400.

Meanwhile, a synchronization apparatus 460 of the B device 450 includes an event messaging unit 461, a change unit 462, and a storage unit 463.

The storage unit 463 stores shared information of the B device 400.

When the shared information of the B device 400 is changed by a user's input, the change unit 462 changes version information of the shared information of the B device 450. The changed version information may be a System Update ID of the B device 450 when the shared information of the B device 450 is changed, and the System Update ID is managed by a CDS.

The event messaging unit 461 requests an event messages subscription to version information of shared information from the A device 400, and receives an event message from the A device 400. Also, when shared information of the B device 450 is changed, then the event messaging unit 461 transmits version information of the changed shared information to the A device 400 via an event message.

Figure 5:
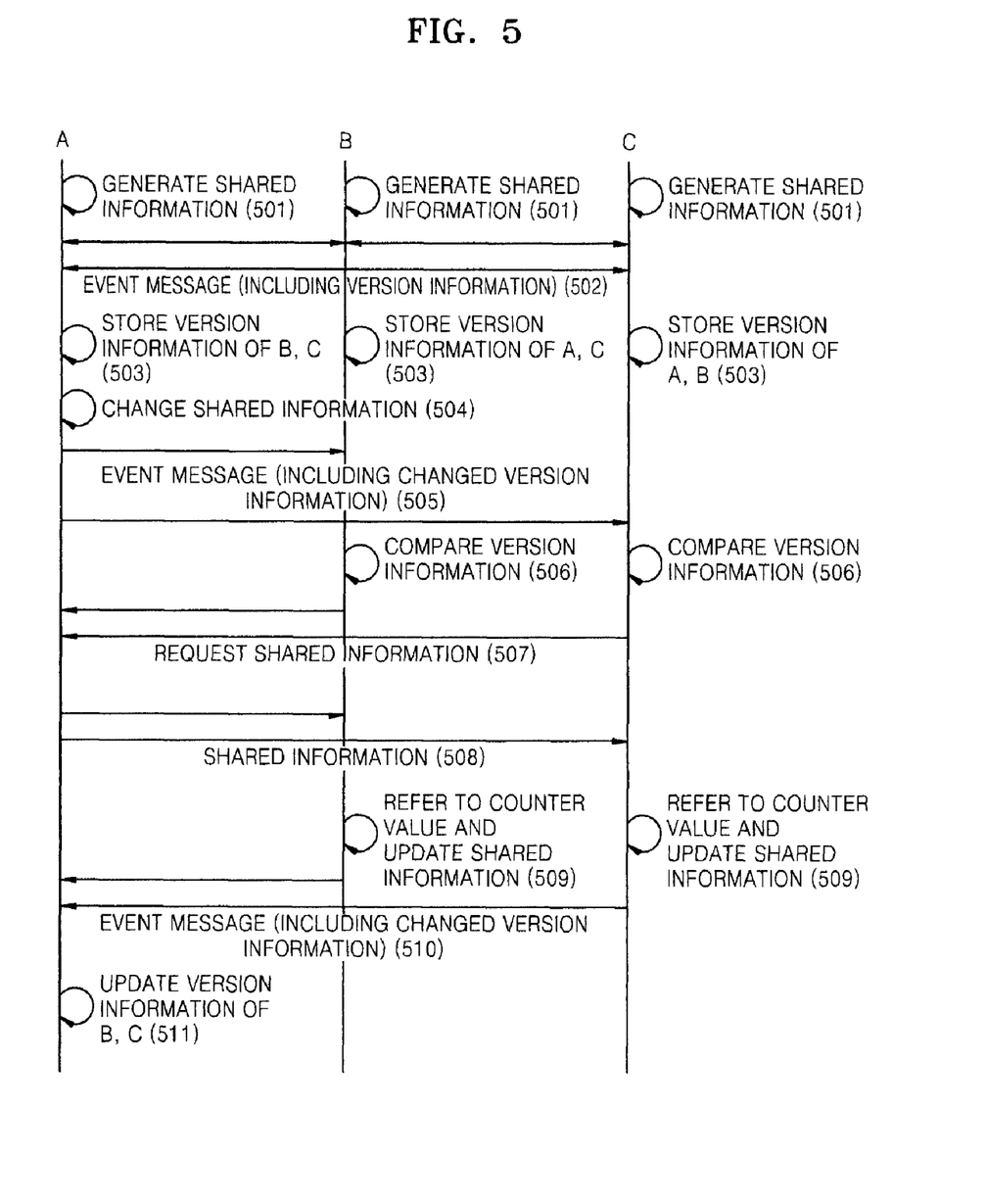
FIG. 5 is a flowchart illustrating a method of synchronizing shared information performed by UPnP devices according to another exemplary embodiment of the present invention.

FIG. 5 is a flowchart illustrating a method of synchronizing shared information performed by UPnP devices according to another exemplary embodiment of the present invention.

The case to be described here is that A, B, and C devices have shared information, and shared information of the A device is changed by inputs from users.

In operation 501, the A, B, and C devices generate identical shared information. Needless to say, counter values included in each part of the generated shared information are identical between all three of the A, B, and C devices.

In operation 502, the A, B, and C devices exchange version information of synchronized shared information via an event message. Version information is individually managed by each of the devices, and thus, although shared information is synchronized, version information of shared information of the devices does not need to be identical. As described above, a System Update ID managed by a CDS may be used as version information, and when shared information is synchronized, e.g., a System Update ID of the A device may be 100 and a System Update ID of the B device may be 200.

In operation 503, the A, B, and C devices store version information of synchronized shared information of each other. That is, the A device stores version information of the B and C devices, the B device stores version information of the A and C devices, and the C device stores version information of the A and B devices.

In operation 504, users change shared information of the A device by using an embedded CP of the A device. Although it is not illustrated in FIG. 5, when shared information is changed, the A device accordingly changes version information of shared information of the A device.

In operation 505, the A device transmits the changed version information to the B and C devices via an event message.

In operation 506, the B and C devices compare the changed version information received in operation 505 with version information of shared information of the A device respectively stored in the B and C devices.

In operation 507, as a result of comparing version information, the B and C devices recognize that shared information of the A device is changed, and request changed shared information from the A device.

In operation 508, the A device transmits the changed shared information to the B and C devices.

In operation 509, the B and C devices update shared information of the B and C devices, respectively, by referring to counter values. That is, the B device updates it's shared information, by referring to a part from among each part of shared information received from the A device, if the part is changed by the A device. From among counter values for each of the parts of shared information received from the A device, a counter value for a part to be possibly changed by the C device is identical to a counter value for a corresponding part of shared information of the B device. Thus, an update is not necessary.

In operation 510, an event message indicating that shared information of the B and C devices are changed is transmitted to the A device. Although it is not illustrated in FIG. 5, as shared information is changed, version information of the shared information is changed accordingly. Thus, the changed version information is included in the event message.

In operation 511, the A device updates already stored version information of shared information of the B and C devices, by using the version information received from the B and C devices.

Figure 6A:
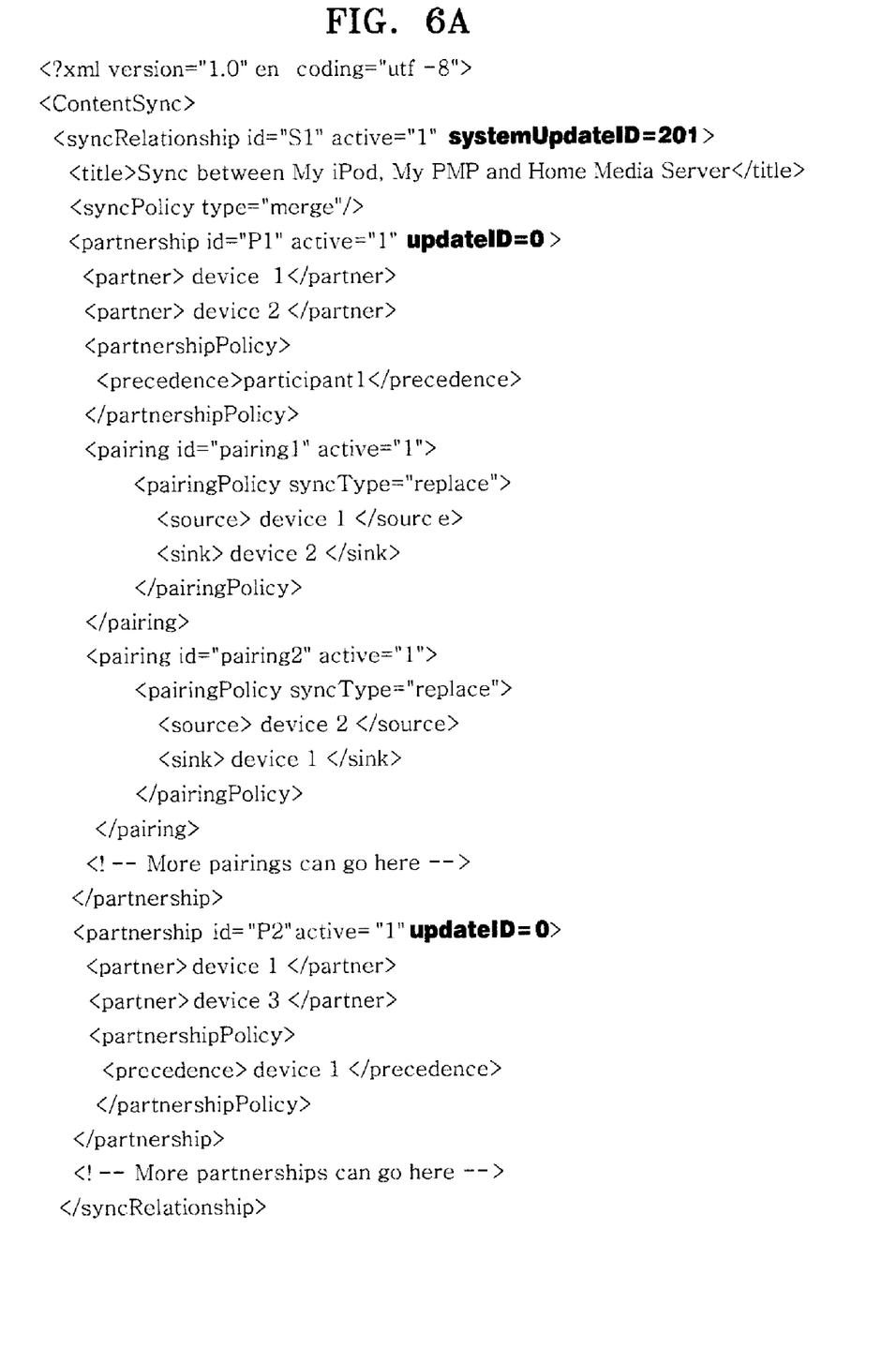
FIGS. 6A through 6B are diagrams illustrating a method of synchronizing shared information performed by UPnP devices according to another exemplary embodiment of the present invention.
Figure 6B:
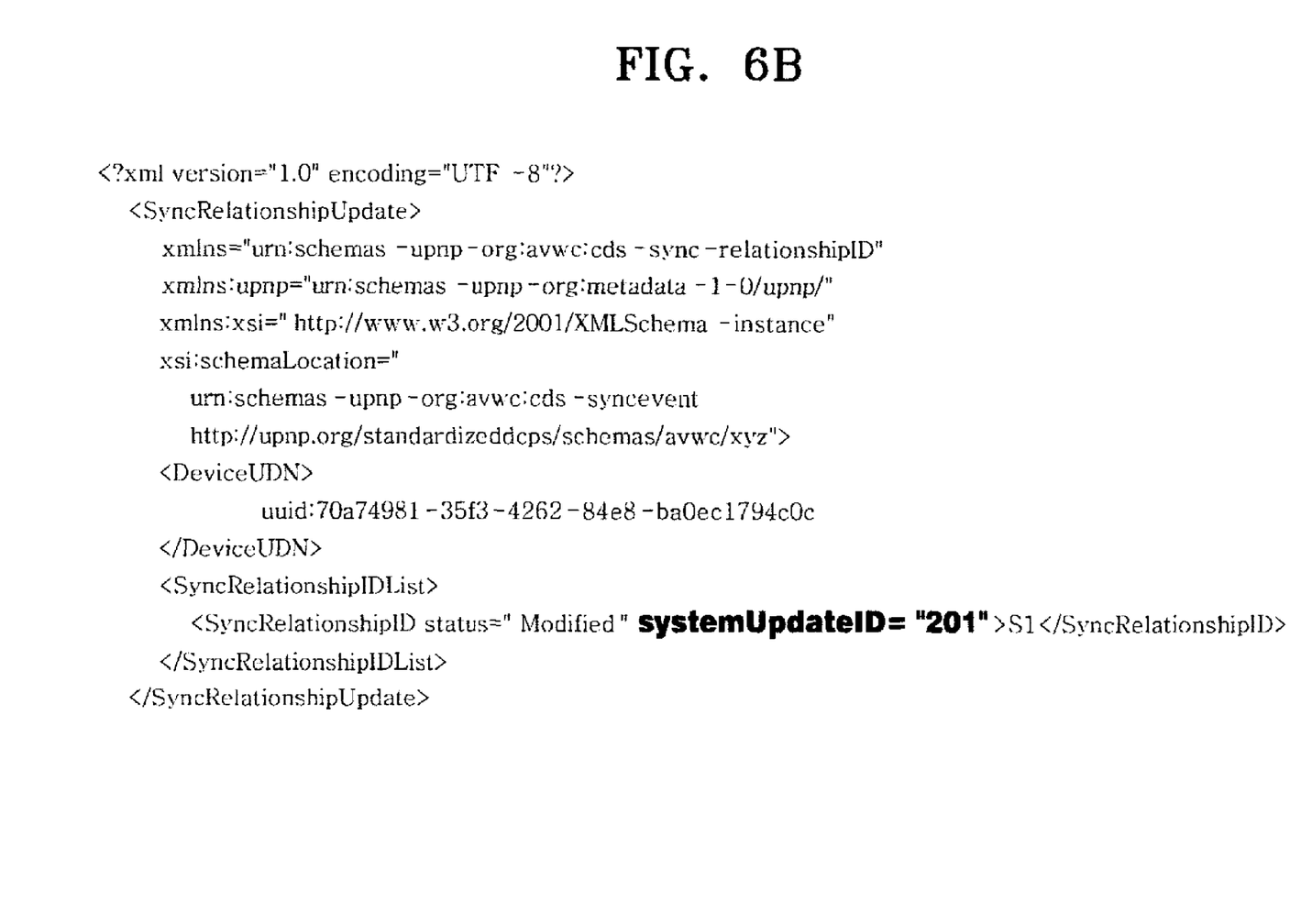

FIGS. 6A through 6B are diagrams illustrating a method of synchronizing shared information by UPnP devices according to another exemplary embodiment of the present invention.

In the current exemplary embodiment, devices 1, 2, and 3 are a media server of a UPnP Audio Video (AV) architecture, and shared information is in a Sync Relationship in which a synchronization strategy, a partner device, or the like are pre-indicated, for synchronization of a CDS.

The Sync Relationship has to be shared in a state synchronized by a plurality of UPnP devices designated in the Sync Relationship. However, some of the Sync Relationship may be changed between some devices, but not all of the devices which share the Sync Relationship. For example, several partnerships exist in Sync Relationship, and devices involved in each of the partnerships are different according to the each of the partnerships. Thus, there is a chance that the each of the partnerships is changed in only some of the devices.

For example, in the Sync Relationship illustrated in FIG. 6A, information having P1 as a partnership ID may be changed in only devices 1 and 2, and information having P2 as a partnership ID may be changed in only devices 1 and 3.

For example, in the case where devices 1 and 2 change information having P1 as a partnership ID during a period when power of device 3 is turned off, the Sync Relationship of device 3 may become different from that of the devices 1 and 2.

However, as illustrated in FIG. 6A, in the current exemplary embodiment, a System Update ID is used as version information of the Sync Relationship. In the above described example, when the power of device 3 is turned on, device 3 subscribes to event messages of devices 1 and 2, and receives an event message. When the changed Sync Relationship stored in device 1 is that as illustrated in FIG. 6A, an event message to be transmitted from device 1 to device 3 later entering into a network may have a structure that is as illustrated in FIG. 6B. Referring to FIG. 6B, the event message includes version information of the Sync Relationship stored in device 1, that is, a System Update ID. Since previously stored version information (e.g., 190) on the Sync Relationship of the device 1 is lower than version information (e.g., 201) included in the event message, device 3 may recognize that device 3 has to update the Sync Relationship of device 3. Device 3 may also recognize this by an event message received from device 2.

As illustrated in FIG. 6A, in each part of the Sync Relationship that is in a partnership, there is a counter indicating an update state of the respective parts, that is an update ID. When shared information is generated identically between all devices, an identical update ID (e.g., Update ID=0) is recorded in the Sync Relationship of all the devices.

Then, devices 1 and 2 change a part having a partnership ID=P1, and in the Sync Relationship of devices 1 and 2, devices 1 and 2 change an update ID of a corresponding part to 1. By doing so, devices 1 and 2 share the same information, but device 3 has information partly different from that of devices 1 and 2.

However, later, device 3 may receive the Sync Relationship of devices 1 and 2, so as to update information of device 3 to the latest information. That is, device 3 recognizes that an update ID of device 3 for a part having partnership ID=P1 is 0 while an update ID of devices 1 and 2 is 1, so that a part having partnership ID=P1 from among the Sync Relationship of device 3 has to be updated. Accordingly, device 3 changes the part having partnership ID=P1, so as to be the same as information of devices 1 and 2. Then, device 3 changes an update ID of the corresponding part, so as to be the same as devices 1 and 2.

According to the present invention, although information shared between a plurality of UPnP devices is partly changed by each of the UPnP devices, all of the corresponding UPnP devices may update shared information of the corresponding UPnP devices, so as to be the latest.

The exemplary embodiments of the present invention can be written as computer programs and can be implemented in general-use digital computers that execute the programs using a computer readable recording medium.

Examples of the computer readable recording medium include magnetic storage media (e.g., read-only memory (ROM), floppy disks, hard disks, etc.), and optical recording media (e.g., compact disc (CD)-ROMs, or digital versatile discs (DVDs)).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of managing shared information synchronized between one device and at least one other device in a Universal Plug and Play (UPnP) network, the method comprising:
storing version information of the synchronized shared information of the at least one other device;
comparing version information received from the at least one other device with the stored version information; and
updating the synchronized shared information of the one device, based on a result of the comparing,
wherein the updating of the synchronized shared information comprises:
receiving changed shared information corresponding to the received version information from the at least one other device, wherein the received shared information includes a counter value for each part of the shared information of the at least one other device, the counter value increasing whenever a corresponding part of the shared information of the at least one other device is changed; and
changing at least a part of the synchronized shared information of the one device by referring to the counter value for the part of the synchronized shared information of a plurality of other devices that have changed the part.

2. The method of claim 1, wherein the updating of the synchronized shared information further comprises:
changing the stored version information to the received version information.

3. The method of claim 1, wherein the stored version information is received from the at least one other device via an event message.

4. The method of claim 1, further comprising subscribing to event messages for the stored version information.

5. The method of claim 1, wherein the stored version information is a System Update identification (ID) which indicates when the synchronization is performed,
wherein the System Update ID is managed by a content directory service (CDS) of the at least one other device, and
wherein the received version information is another System Update ID which indicates when the synchronized shared information of the at least one other device is changed.

6. A recording medium having recorded thereon a computer program for executing the method of claim 1.

7. The method of claim 1, wherein the version information received from the at least one other device is received via an event message transmitted by the at least one other device.

8. An apparatus for managing shared information synchronized between one device and at least one other device in a UPnP network, the apparatus comprising:
a storage unit which stores version information of the synchronized shared information of the at least one other device;
a comparison unit which compares version information received from the at least one other device with the stored version information; and
a synchronization unit which updates the synchronized shared information of the one device, based on the comparison result of the comparison unit,
wherein the synchronization unit receives changed shared information corresponding to the received version information from the at least one other device, the received shared information including a counter value for each part of the shared information of the at least one other device, the counter value increasing whenever a corresponding part of the shared information of the at least one other device is changed, and changes at least a part of the synchronized shared information of the one device by referring to the counter value for the part of the synchronized shared information of a plurality of other devices that have changed the part.

9. The apparatus of claim 8, wherein the synchronization unit changes the stored version information to the received version information.

10. The apparatus of claim 8, wherein the stored version information is received from the at least on other device via an event message.

11. The apparatus of claim 8, further comprising an event messaging unit subscribing to event messages for the stored version information.

12. The apparatus of claim 8, wherein the stored version information is a System Update identification (ID) which indicates when the synchronization is performed,
 wherein the System Update ID is managed by a content directory service (CDS) of the at least one other device, and
 wherein the received version information is another System Update ID which indicates when the synchronized shared information of the at least one other device has changed.

13. The apparatus of claim 8, wherein the version information received from the at least one other device is received via an event message transmitted by the at least one other device.

14. A method of managing shared information synchronized between one device and at least one other device in a Universal Plug and Play (UPnP) network, the method comprising:
 transmitting version information of the synchronized shared information of the one device to the at least one other device via an event message;
 changing the version information, if the synchronized shared information of the one device is changed by an input from users; and
 transmitting the changed version information to the at least one other device via an event message, wherein the synchronized shared information of the one device includes a counter value for each part of the synchronized shared information of the one device, and wherein the counter value indicates an update state of a corresponding part of the synchronized shared information of the one device and increases whenever the corresponding part is changed; and
 transmitting the synchronized shared information including the counter value of the one device to the at least one other device for updating the synchronized shared information of the at least one other device.

15. The method of claim 14, wherein the synchronized shared information comprises a counter value for each part of the synchronized shared information, the counter value increasing whenever the each part is changed.

16. The method of claim 14, wherein the version information of the synchronized shared information is a System Update identification (ID) which indicates when the synchronization is performed,
 wherein the System Update ID is managed by a content directory service (CDS) of the one device,
 wherein the changed version information is another System Update ID which indicates when the synchronized shared information is changed, and
 wherein the another System Update ID is managed by the CDS.

17. An apparatus for managing shared information synchronized between one device and at least one other device in a Universal Plug and Play (UPnP) network, the apparatus comprising:
 an event messaging unit which transmits version information of the synchronized shared information of the one device to the at least one other device via an event message, and if the version information is changed, transmitting the changed version information to the at least one other device via another event message,
 a change unit which changes the version information, if the synchronized shared information of the one device is changed by an input from users,
 wherein if the version information is changed, the event message unit transmits the changed version information to the at least one other device via an event message, and
 wherein the synchronized shared information of the one device includes a counter value for each part of the synchronized shared information of the one device, and
 wherein the counter value indicates an update state of a corresponding part of the synchronized shared information of the one device and increases whenever the corresponding part is changed, and the one device transmits the synchronized shared information including the counter value of the one device to the at least one other device for updating the synchronized shared information of the at least one other device.

18. The apparatus of claim 17, wherein the synchronized shared information comprises a counter value for each part of the synchronized shared information, the counter value increasing whenever the each part is changed.

19. The apparatus of claim 17, wherein the version information of the synchronized shared information is a System Update identification (ID) which indicates when the synchronization is performed,
 wherein the System Update ID is managed by a content directory service (CDS) of the one device,
 wherein the changed version information is another System Update ID which indicates when the synchronized shared information is changed, and
 wherein the another System Update ID is managed by the CDS.

* * * * *